United States Patent
Fujiwara

(10) Patent No.: US 10,805,476 B2
(45) Date of Patent: Oct. 13, 2020

(54) SCANNER CONFIGURED TO TRANSMIT TARGET SIGNAL AFTER PLACEMENT OPERATION OF ORIGINAL DOCUMENT

(71) Applicant: Brother Kogyo Kabushiki Kaisha, Nagoya-shi, Aichi-ken (JP)

(72) Inventor: Susumu Fujiwara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/220,486

(22) Filed: Dec. 14, 2018

(65) Prior Publication Data
US 2019/0199861 A1 Jun. 27, 2019

(30) Foreign Application Priority Data
Dec. 27, 2017 (JP) ................. 2017-250673

(51) Int. Cl.
*H04N 1/00* (2006.01)
*G06F 3/12* (2006.01)
*H04N 1/12* (2006.01)

(52) U.S. Cl.
CPC ......... *H04N 1/0001* (2013.01); *G06F 3/1203* (2013.01); *G06F 3/1232* (2013.01); *G06F 3/1287* (2013.01); *H04N 1/121* (2013.01)

(58) Field of Classification Search
None
See application file for complete search history.

(56) References Cited

U.S. PATENT DOCUMENTS

| 2010/0157381 | A1* | 6/2010 | Chen | H04N 1/00689 |
| | | | | 358/449 |
| 2016/0011824 | A1* | 1/2016 | Ishimura | G06F 3/1236 |
| | | | | 358/1.15 |

FOREIGN PATENT DOCUMENTS

| JP | 2014-002648 A | 1/2014 |
| JP | 2014-177087 A | 9/2014 |

(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Lennin R Rodriguezgonzalez
*Assistant Examiner* — Lennin R Rodriguez
(74) *Attorney, Agent, or Firm* — Banner & Witcoff, Ltd.

(57) ABSTRACT

A program causes, when executed, a terminal apparatus to perform operations including: receiving a target signal from a target scanner, the target signal being sequentially transmitted from the target scanner after a placement operation of placing an original document of a scan target is performed at the target scanner, the target signal not being transmitted from the target scanner before the placement operation is performed at the target scanner; in response to receiving the target signal from the target scanner, acquiring target communication information for performing wireless communication between the terminal apparatus and the target scanner through a target network; in response to acquiring the target communication information, transmitting a scan request to the target scanner through the target network by using the target communication information; and in response to transmitting the scan request to the target scanner, receiving scan data from the target scanner through the target network.

8 Claims, 6 Drawing Sheets

(56) References Cited

FOREIGN PATENT DOCUMENTS

| JP | 2015-056776 A | 3/2015 |
| JP | 2017-037664 A | 2/2017 |
| JP | 2017-063308 A | 3/2017 |

OTHER PUBLICATIONS

Wi-Fi Alliance Technical Committee P2P Task Group, "Wi-Fi Peer-to Peer (P2P) Technical Specification", Version 1.5, pp. 1-183, 2014.

* cited by examiner

SCANNER CONFIGURED TO TRANSMIT TARGET SIGNAL AFTER PLACEMENT OPERATION OF ORIGINAL DOCUMENT

CROSS REFERENCE TO RELATED APPLICATIONS

This application claims priority from Japanese Patent Application No. 2017-250673 filed Dec. 27, 2017. The entire content of the priority application is incorporated herein by reference.

TECHNICAL FIELD

This disclosure relates to a terminal apparatus, a scanner, and a storage medium storing a computer program.

BACKGROUND

It is disclosed that communication is performed between an information processing apparatus and an electronic apparatus which includes a printer and a scanner. The information processing apparatus transmits, through a speaker, a sound wave signal serving as an address-information acquisition request, and the electronic apparatus receives the sound wave signal through a microphone. In this case, the electronic apparatus transmits, through the speaker, a sound wave signal serving as a response signal which includes the IP address of the electronic apparatus and so on, and the information processing apparatus receives the sound wave signal through the microphone. Then, the information processing apparatus transmits an output request including image data through a network (that is, an access point) to the electronic apparatus by using the IP address as a destination. Consequently, the electronic apparatus performs printing corresponding to the image data.

SUMMARY

According to one aspect, this specification discloses a non-transitory computer-readable storage medium storing a program executable on a computer of a terminal apparatus. The program causes, when executed, the terminal apparatus to perform operations comprising: a target-signal receiving operation of receiving a target signal from a target scanner, the target signal being sequentially transmitted from the target scanner after a placement operation of placing an original document of a scan target is performed at the target scanner, and the target signal not being transmitted from the target scanner before the placement operation is performed at the target scanner; an acquiring operation of, in response to receiving the target signal from the target scanner, acquiring target communication information for performing wireless communication between the terminal apparatus and the target scanner through a target network; a scan-request transmitting operation of, in response to acquiring the target communication information, transmitting a scan request to the target scanner through the target network by using the target communication information, the scan request requesting the target scanner to perform scan of the original document; and a scan-data receiving operation of, in response to transmitting the scan request to the target scanner, receiving scan data from the target scanner through the target network, the scan data being obtained by scan of the original document.

According to another aspect, this specification also discloses a terminal apparatus. The terminal apparatus includes a controller. The controller is configured to perform: receiving a target signal from a target scanner, the target signal being sequentially transmitted from the target scanner after a placement operation of placing an original document of a scan target is performed at the target scanner, and the target signal not being transmitted from the target scanner before the placement operation is performed at the target scanner; in response to receiving the target signal from the target scanner, acquiring target communication information for performing wireless communication between the terminal apparatus and the target scanner through a target network; in response to acquiring the target communication information, transmitting a scan request to the target scanner through the target network by using the target communication information, the scan request requesting the target scanner to perform scan of the original document; and in response to transmitting the scan request to the target scanner, receiving scan data from the target scanner through the target network, the scan data being obtained by scan of the original document.

According to still another aspect, this specification also discloses a scanner. The scanner includes a scan performing device and a scanner controller. The scan performing device includes at least one of an ADF (Auto Document Feeder) and an FB (Flat Bed). The scanner controller is configured to perform: sequentially transmitting a target signal after a placement operation of placing an original document of a scan target on the at least one of the ADF and the FB is performed, the target signal not being transmitted before the placement operation is performed; receiving a scan request from a terminal apparatus through a target network for performing wireless communication between the scanner and the terminal apparatus after the terminal apparatus has received the target signal, the scan request requesting that the scanner performs scan of the original document; in response to receiving the scan request, controlling the scan performing device to perform scan of the original document; and transmitting scan data to the terminal apparatus through the target network, the scan data being obtained by scan of the original document.

BRIEF DESCRIPTION OF THE DRAWINGS

Embodiments in accordance with this disclosure will be described in detail with reference to the following figures wherein.

DETAILED DESCRIPTION

In the technology described above, it is not considered at all that the communication of scan data is performed by utilization of the sound wave signal between the information processing apparatus and the electronic apparatus. The present specification discloses a technology for performing the communication of a scan request and scan data between a terminal apparatus and a scanner by utilization of a new method.

Some aspects of this disclosure will be described while referring to the attached drawings.

First Embodiment

Figure 1:
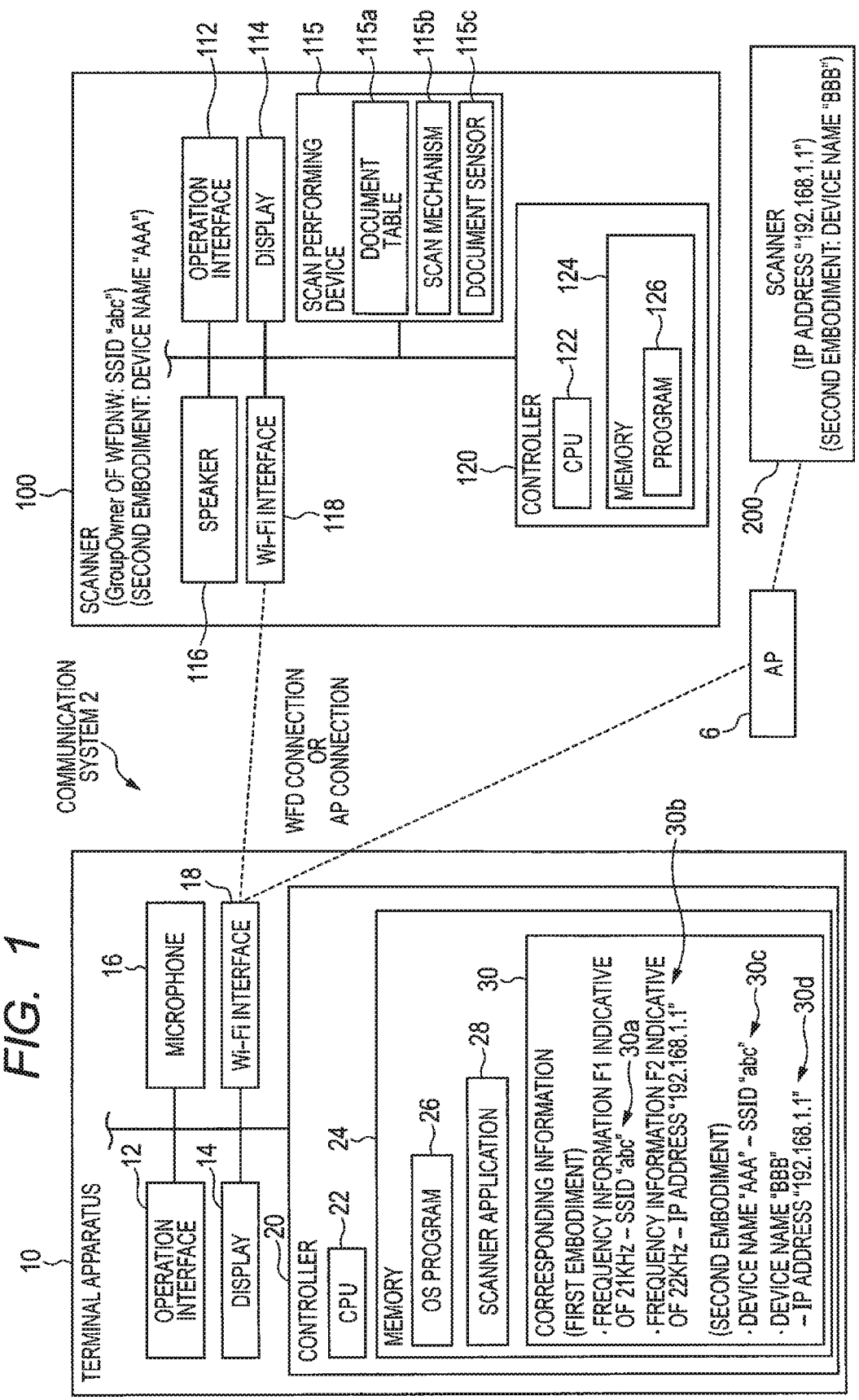
FIG. 1 shows a configuration of a communication system according to first and second embodiments.

<Configuration of Communication System 2; FIG. 1>

As shown in FIG. 1, a communication system 2 includes a terminal apparatus 10 and a plurality of scanners 100 and 200. The terminal apparatus 10 and the scanner 100 establish wireless connection (hereinafter referred to as "WFD connection") corresponding to a WFD (abbreviation of Wi-Fi Direct (registered trademark)) system without intervention of an access point 6 (hereinafter referred to as an "AP 6"), and thereby form a WFD network. In this state, the terminal apparatus 10 and the scanner 100 communicate with each other through the WFD network (that is, without intervention of the AP 6). The terminal apparatus 10 and the scanner 200 establish wireless connection with the AP 6 (hereinafter referred to as "AP connection") and thereby participate in an AP network. In this state, the terminal apparatus 10 and the scanner 200 communicate with each other through the AP network (that is, through the AP 6).

<Configuration of Terminal Apparatus 10>

The terminal apparatus 10 is a user terminal such as a desktop PC (abbreviation of Personal Computer), a notebook PC, a tablet PC, or a smart phone. The terminal apparatus 10 includes an operation interface 12, a display 14, a microphone 16, a Wi-Fi interface 18, and a controller 20. The elements 12 to 20 are connected to bus lines (reference numerals are omitted).

The operation interface 12 includes a plurality of keys. A user operates the operation interface 12 so as to provide various instructions to the terminal apparatus 10. The display 14 displays various types of information. The display 14 also functions as a so-called touch panel (that is, the operation interface). The microphone 16 is an interface for receiving a sound wave signal.

The Wi-Fi interface 18 is a wireless interface for performing wireless communication in accordance with a Wi-Fi system. The Wi-Fi system is, for example, a wireless communication system for performing wireless communication according to the standard of IEEE (abbreviation of the Institute of Electrical and Electronics Engineers, Inc.) 802.11 and similar standards (for example, IEEE 802.11a, 11b, 11g, 11n, and so on). The Wi-Fi interface 18 particularly supports the WFD (abbreviation of Wi-Fi Direct (registered trademark)) system which is determined by Wi-Fi Alliance, and performs the wireless communication (hereinafter referred to as the "WFD communication") corresponding to the WFD system. The WFD system is a wireless communication system which is described in a specification "Wi-Fi Peer-to-Peer (P2P) Technical Specification Version 1.1" which is produced by Wi-Fi Alliance.

The controller 20 includes a CPU 22 and a memory 24. The CPU 22 performs various types of processing according to programs 26 and 28 stored in the memory 24. The memory 24 is formed with a ROM, a RAM, and so on. The memory 24 stores an OS program 26, a scanner application 28 (hereinafter simply referred to as an "application 28") and correspondence information 30. The OS program 26 is a program for realizing the basic operation of the terminal apparatus 10. The application 28 is an application for making each of the scanners 100 and 200 perform scanning. For example, the application 28 may be installed into the terminal apparatus 10 from a server on the Internet provided by the vendor of each of the scanners 100 and 200, or may be installed into the terminal apparatus 10 from a medium shipped together with each of the scanners 100 and 200. The correspondence information 30 includes, for each of one or more scanners 100 and 200, frequency information that indicates the frequency of an ultrasonic wave transmitted from the scanner and communication information necessary for performing wireless communication with the scanner, in association with each other. The correspondence information 30 is stored in the memory 24 by the processing of FIG. 2 described later.

<Configuration of Scanners 100 and 200>

The scanners 100 and 200 are peripheral devices (that is, the peripheral devices of the terminal apparatus 10) which perform a scan function. Each of the scanners 100 and 200 may be a multifunctional peripheral which performs, in addition to the scan function, a print function, a fax function, and so on.

The scanner 100 operates as a Group Owner (hereinafter referred to as a "G/O") of the WFD system, and forms, when establishing the WFD connection with the terminal apparatus 10, the WFD network in which the scanner 100 operates as a master device and the terminal apparatus 10 operates as a slave device. An SSID (abbreviation of Service Set Identifier), which is an identifier for identifying the WFD network, is "abc". In FIG. 1 and so on, the WFD network is described as a "WFDNW". The scanner 100 includes an operation interface 112, a display 114, a scan performing device 115, a speaker 116, a Wi-Fi interface 118, and a controller 120. The elements 112 to 120 are connected to bus lines (reference numerals are omitted).

The operation interface 112 includes a plurality of keys. The user operates the operation interface 112 so as to provide various instructions to the scanner 100. The display 114 displays various types of information. The display 114 also functions as the so-called touch panel (that is, the operation interface). The scan performing device 115 includes a document table 115a, a scan mechanism 115b, and a document sensor 115c. In the present embodiment, the document table 115a is a flatbed type document table, and includes a transparent plate and a cover member which covers the transparent plate and which is opened and closed. In a modification, the document table 115a may include an ADF (abbreviation of Auto Document Feeder). The scan mechanism 115b includes a reading sensor of a CCD system, a CIS system, or the like. The speaker 116 is an interface which transmits sound waves, and particularly transmits an ultrasonic wave. In the present embodiment, the ultrasonic wave is a sound wave which has a frequency of 20 KHz or higher. The Wi-Fi interface 118 is a wireless interface for performing wireless communication in accordance with the Wi-Fi system, and particularly supports the WFD system.

The controller 120 includes a CPU 122 and a memory 124. The CPU 122 is a processor which performs various types of processing according to a program 126 stored in the memory 124. The memory 124 is formed with a ROM, a RAM, and so on.

The scanner 200 has the same configuration as the scanner 100. However, the scanner 200 is not operated as the G/O of the WFD system, and establishes the AP connection with the AP 6. In other words, the scanner 200 participates as a slave device in the AP network in which the AP 6 operates as a master device. The IP address of the scanner 200 in the AP network is "192.168.1.1".

The scanners 100 and 200 are manufactured by the same vendor. The frequency of an ultrasonic wave sound which is transmitted by the scanner 100 through the speaker 116 differs from the frequency of an ultrasonic wave sound which is transmitted by the scanner 200 through a speaker (not shown). Specifically, the frequency of the scanner 100 is 21 KHz, and the frequency of the scanner 200 is 22 KHz. As described above, a plurality of scanners 100 and so on which are manufactured by the vendor transmit ultrasonic waves whose frequencies differ from each other. In other words, the frequencies of the ultrasonic waves transmitted from each of the scanners 100 and so on are information which identifies each of the scanners 100 and so on.

Figure 2:
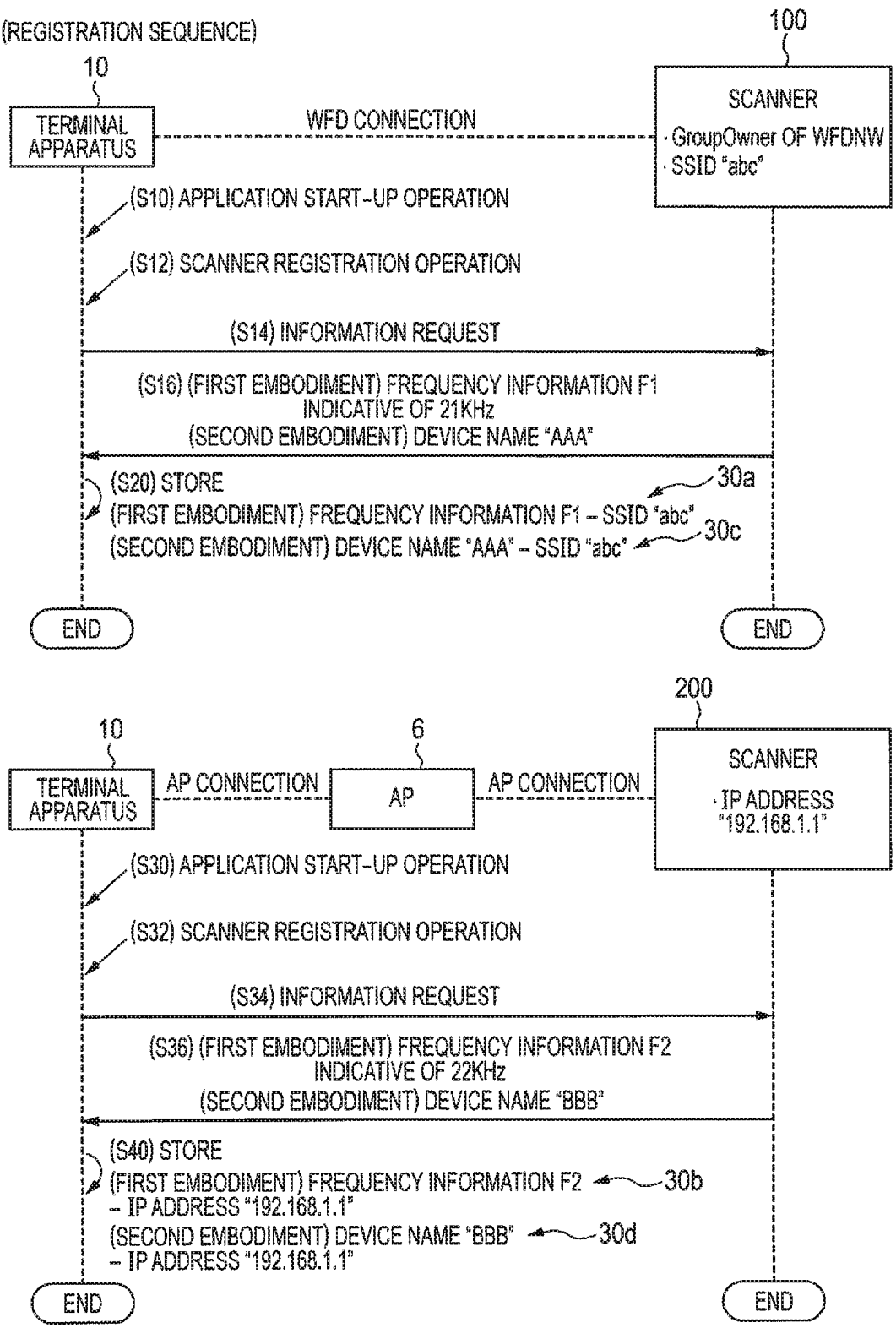
FIG. 2 shows a registration sequence for registering correspondence information in a terminal apparatus according to the first and second embodiments.

<Registration Sequence; FIG. 2>

Processing for registering the correspondence information 30 of each of the scanners 100 and 200 in the terminal apparatus 10 will be described with reference to FIG. 2. The processing is actually performed by the CPU 22 of the terminal apparatus 10, the CPUs 122 of the scanners 100 and 200, and so on. In the following description, however, it will be described that the processing is performed by the terminal apparatus 10 and the scanners 100 and 200 for simplicity. The same is true for FIGS. 4 to 6 described later.

Processing for registering the correspondence information 30a of the scanner 100 in the terminal apparatus 10 will first be described. The WFD connection is established between the terminal apparatus 10 and the scanner 100, and the terminal apparatus 10 and the scanner 100 communicate with each other through the WFD network (that is, without intervention of the AP 6). When the terminal apparatus 10 establishes the WFD connection with the scanner 100, the terminal apparatus 10 acquires the SSID "abc" of the WFD network and the IP address of the scanner 100 in the WFD network, and stores the information in the memory 24.

In S10, the terminal apparatus 10 receives from the user an operation of starting up the application 28. In this way, each of the subsequent processing performed by the terminal apparatus 10 is realized by the application 28. In S12, the terminal apparatus 10 receives an operation of providing an instruction to newly register the information of the scanner on a screen displayed by the application 28 on the display 14. In this case, in S14, the terminal apparatus 10 transmits an information request to the scanner 100 through the WFD network by using the IP address of the scanner 100 as a destination. The information request is a signal which requests the scanner 100 to transmit information for identifying the scanner 100. In the present embodiment, the information is frequency information which indicates the frequency of an ultrasonic wave that the scanner 100 is configured to transmit.

In response to receiving the information request from the terminal apparatus 10 in S14, in S16 the scanner 100 transmits frequency information F1 indicative of 21 KHz to the terminal apparatus 10 through the WFD network.

In response to receiving the frequency information F1 from the scanner 100 in S16, in S20 the terminal apparatus 10 stores the correspondence information 30a of the scanner 100 in the memory 24. Specifically, the terminal apparatus 10 first identifies the SSID "abc" of the WFD network from the memory 24 as communication information necessary for performing wireless communication between the terminal apparatus 10 and the scanner 100 through the WFD network. Then, the terminal apparatus 10 stores, in the memory 24, the correspondence information 30a including the received frequency information F1 and the SSID "abc" that is the identified communication information in association with each other. In this way, the registration of the correspondence information 30a of the scanner 100 is completed.

Next, processing for registering the correspondence information 30b of the scanner 200 in the terminal apparatus 10 will be described. The terminal apparatus 10 disconnects the WFD connection with the scanner 100, and thereafter establishes the AP connection with the AP 6. In this way, the terminal apparatus 10 and the scanner 200 communicate with each other through the AP network (that is, through the AP 6).

S30 and S32 are the same as S10 and S12 described above. Although not shown in the figure, when the terminal apparatus 10 receives an operation in S32, the terminal apparatus 10 transmits a broadcast search signal to the AP 6 and receives a response signal from the scanner 200. In this way, the terminal apparatus 10 finds the IP address "192.168.1.1" of the scanner 200 included in the response signal, and stores the IP address in the memory 24. Then, in S34, the terminal apparatus 10 transmits an information request through the AP network to the scanner 200 by using the IP address of the scanner 200 as a destination.

In response to receiving the information request from the terminal apparatus 10 in S34, in S36 the scanner 200 transmits frequency information F2 indicative of 22 KHz to the terminal apparatus 10 through the AP network.

In response to receiving the frequency information F2 from the scanner 200 in S36, in S40 the terminal apparatus 10 stores the correspondence information 30b of the scanner 200 in the memory 24. Specifically, the terminal apparatus 10 first identifies the IP address "192.168.1.1" of the scanner 200 from the memory 24 as communication information necessary for performing wireless communication between the terminal apparatus 10 and the scanner 200 through the AP network. Then, the terminal apparatus 10 stores, in the memory 24, the correspondence information 30b including the received frequency information F2 and the IP address "192.168.1.1" that is the identified communication information in association with each other. In this way, the registration of the correspondence information 30b of the scanner 200 is completed.

Figure 3:
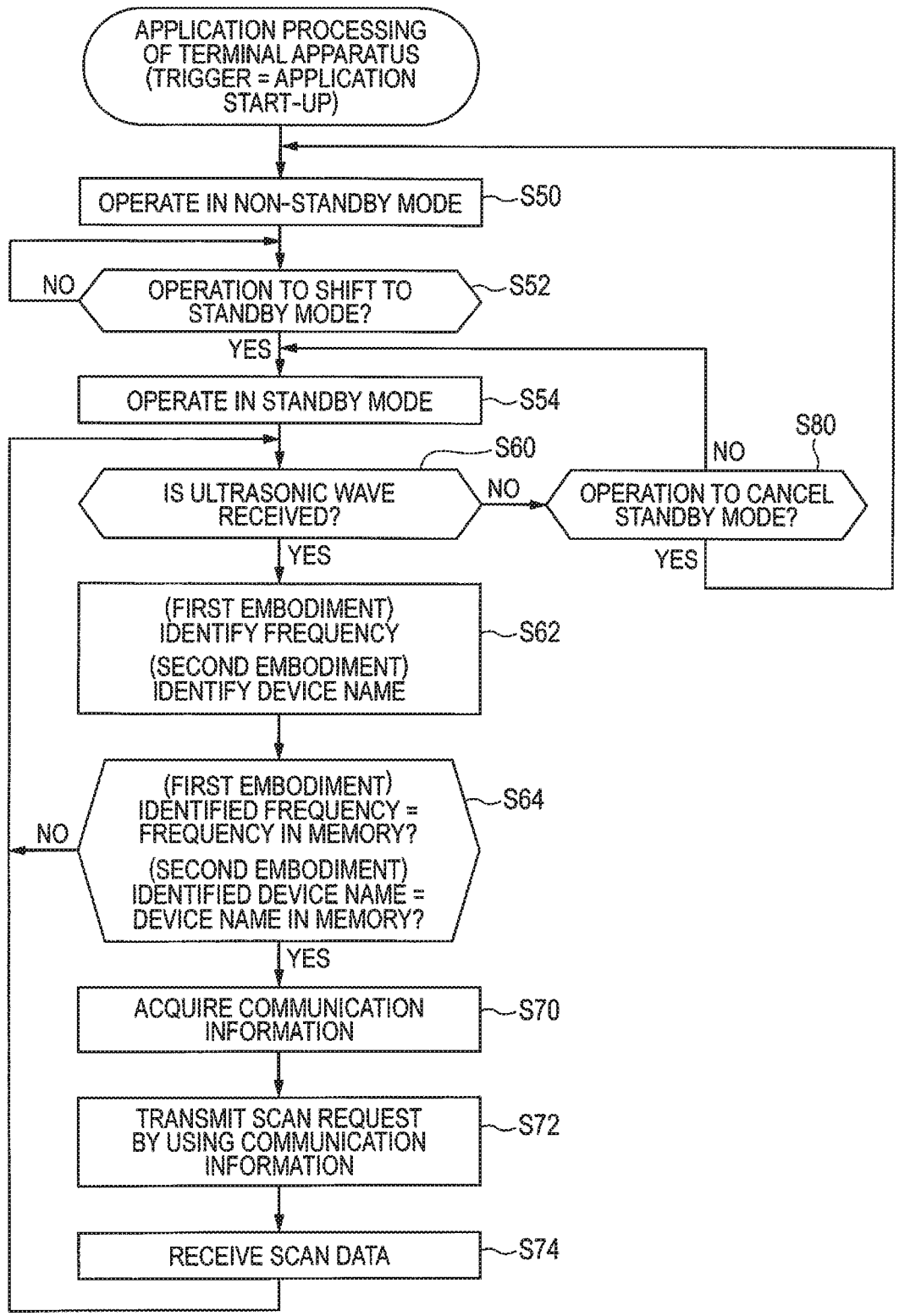
FIG. 3 shows a flowchart of processing executed by a scanner application of the terminal apparatus according to the first and second embodiments.

<Application Processing of Terminal Apparatus 10; FIG. 3>

Next, scan processing which is performed by the CPU 22 of the terminal apparatus 10 according to the application 28 will be described with reference to FIG. 3. The scan processing is processing for transmitting a scan request to the scanner (for example, the scanner 100) and receiving scan data from the scanner. When the application 28 of the terminal apparatus 10 is started up, the processing of FIG. 3 is started.

In S50, the CPU 22 starts an operation in a non-standby mode. The non-standby mode is a mode in which the CPU 22 is not on standby for reception of an ultrasonic wave signal. In other words, even when the ultrasonic wave signal is transmitted from the scanner (for example, the scanner 100) and the ultrasonic wave signal is received in the microphone 16 while the CPU 22 is operating in the non-standby mode, the subsequent processing (for example, S62 to S74) is not performed.

In S52, the CPU 22 monitors the reception of an operation of providing an instruction to shift from the non-standby mode to a standby mode. The standby mode is a mode in which the CPU 22 is on standby for the reception of the ultrasonic wave signal and in which when the ultrasonic wave signal is received in the microphone 16, the subsequent processing (for example, S62 to S74) is performed. In response to receiving the operation (YES in S52), the CPU 22 shifts to the standby mode in S54.

When the CPU 22 shifts to the standby mode, the monitoring in S60 and S80 is performed. In S60, the CPU 22 monitors the reception of the ultrasonic wave signal from the scanner (for example, the scanner 100). When the ultrasonic wave signal is received in the microphone 16, the CPU 22 makes YES determination in S60, and the CPU 22 proceeds to S62. In the following description, the scanner which transmits the ultrasonic wave signal received here is referred to as a "target scanner". In S80, the CPU 22 monitors the reception of an operation of providing an instruction to cancel the standby mode, that is, an operation of providing an instruction to shift from the standby mode to the non-standby mode. In response to receiving the operation (YES in S80), in S50 the CPU 22 shifts to the non-standby mode.

In S62, the CPU 22 utilizes the ultrasonic wave signal received from the target scanner in S60 so as to identify the frequency of the ultrasonic wave. Specifically, the CPU 22 performs FFT (Fast Fourier Transformation) analysis on the ultrasonic wave so as to identify the frequency. In response to receiving the ultrasonic wave signal from the scanner 100, the CPU 22 identifies 21 KHz. In response to receiving the ultrasonic wave signal from the scanner 200, the CPU 22 identifies 22 KHz.

In S64, the CPU 22 determines whether the frequency identified in S62 matches any of one or more frequency information included in one or more correspondence information 30 in the memory 24. When the CPU 22 determines that the identified frequency matches any of one or more frequency information described above (YES in S64), the CPU 22 proceeds to S70. When the CPU 22 determines that the identified frequency does not match any of one or more frequency information described above (NO in S64), the CPU 22 returns to S60 without performing S70 to S74. For example, in a state (see S20 of FIG. 2) where the correspondence information 30a of the scanner 100 is stored in the memory 24, when the CPU 22 receives the ultrasonic wave signal from the scanner 100, the CPU 22 determines that the identified frequency "21 KHz" matches the frequency information F1 included in the correspondence information 30a (YES in S64), and proceeds to S70.

In S70, the CPU 22 acquires, from the memory 24, the communication information associated with the frequency information that is determined to match in S64. For example, in response to receiving the ultrasonic wave signal from the scanner 100 in a state where the correspondence information 30a of the scanner 100 is stored in the memory 24, the CPU 22 acquires the SSID "abc" which is associated with the frequency information F1 that is determined to match in S64.

In S72, the CPU 22 utilizes the communication information acquired in S70 so as to transmit, to the target scanner through the Wi-Fi interface 18, a scan request for requesting the target scanner to scan an original document. For example, when the acquired communication information is the SSID "abc" of the WFD network in which the scanner 100 operates as the master device, the CPU 22 utilizes the SSID "abc" so as to establish the WFD connection with the scanner 100 and transmits the scan request through the WFD network to the scanner 100. For example, when the acquired communication information is the IP address "192.168.1.1" of the scanner 200, the CPU 22 transmits the scan request through the AP network by using the IP address as the destination.

In S74, after the original document is scanned by the target scanner according to the scan request transmitted in S72, the CPU 22 receives scan data from the target scanner through the Wi-Fi interface 18. For example, in response to transmitting the scan request to the scanner 100 in S72, the CPU 22 receives the scan data from the scanner 100 through the WFD network. For example, in response to transmitting the scan request to the scanner 200 in S72, the CPU 22 receives the scan data from the scanner 200 through the AP network.

When S74 is completed, the CPU 22 returns to S60 so as to perform the monitoring in S60 and S80 again. In other words, even after the CPU 22 transmits the scan request to the target scanner and receives the scan data from the target scanner, the CPU 22 continues the operation in the standby mode. In this way, when a new original document is placed on the target scanner, and thus the ultrasonic wave signal is transmitted again from the target scanner, the CPU 22 performs the processing in S62 to S74 again.

Figure 4:
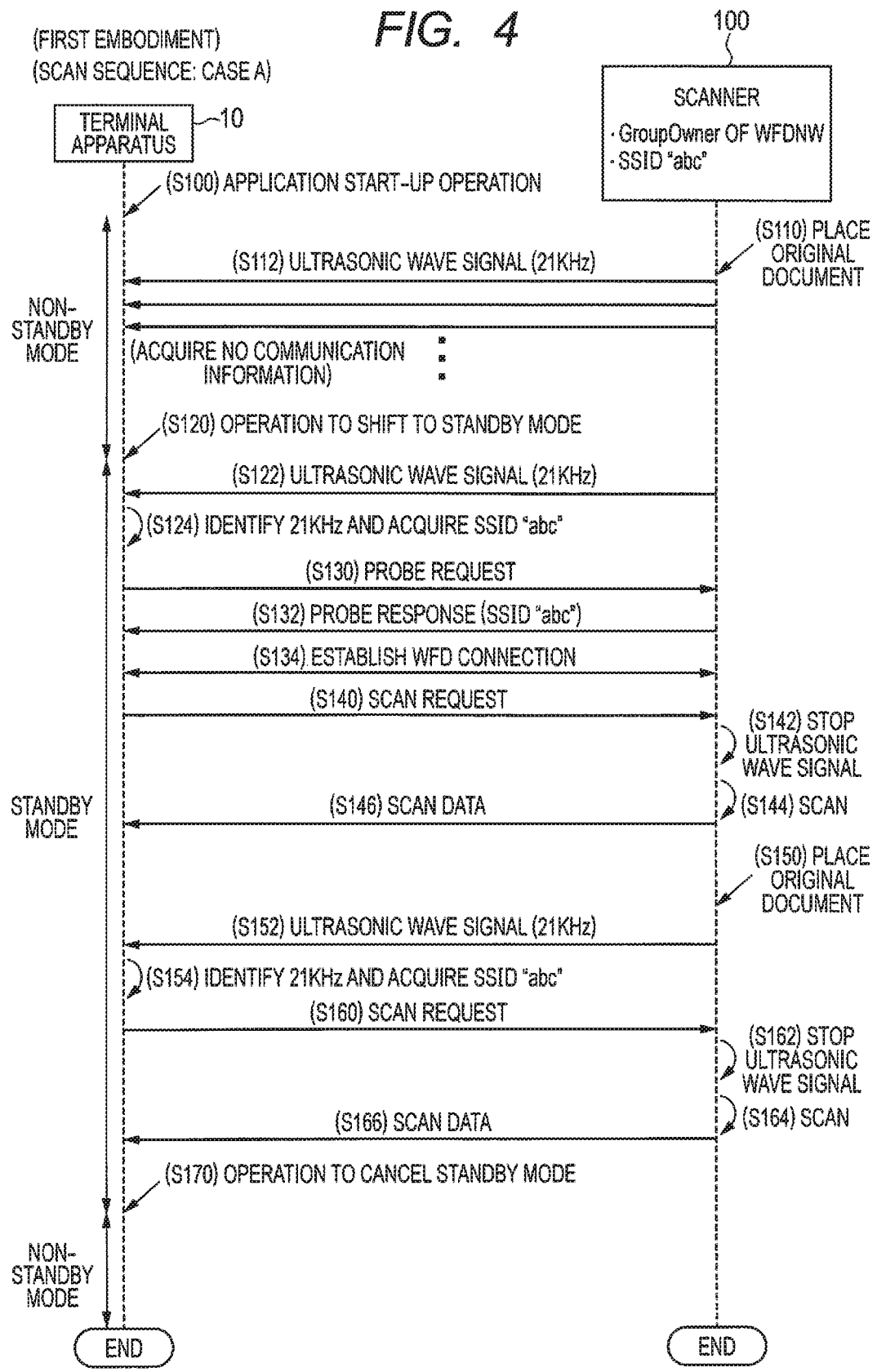
FIG. 4 shows a sequence chart of a case A that is performed between the terminal apparatus and a first scanner according to the first embodiment.
Figure 5:
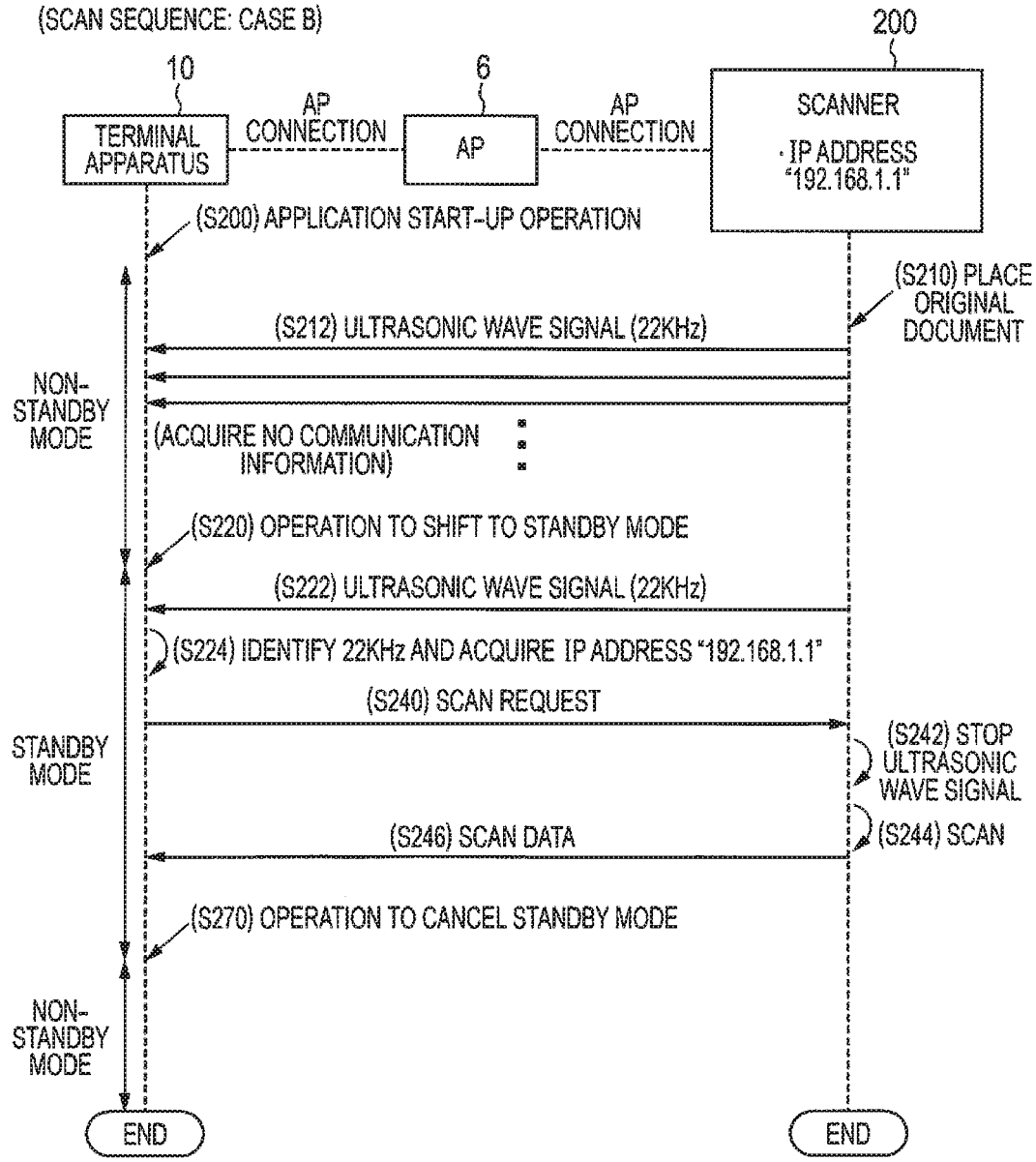
FIG. 5 shows a sequence chart of a case B that is performed between the terminal apparatus and a second scanner according to the first embodiment.

<Specific Cases; FIGS. 4 and 5>

Next, specific cases A and B, which are realized by the processing of FIG. 3, will be described with reference to FIGS. 4 and 5.

<Case A; FIG. 4>

The case A which is realized between the terminal apparatus 10 and the scanner 100 will first be described with reference to FIG. 4. In the initial state of the case A, the WFD connection is not established between the terminal apparatus 10 and the scanner 100. When in S100, the terminal apparatus 10 receives the operation of starting up the application 28 (trigger of the processing of FIG. 3), the terminal apparatus 10 operates in the non-standby mode.

In S110, a placement operation for placing the original document of scan target on the document table 115a is performed at the scanner 100. In response to the placement operation, in S112 the scanner 100 starts transmitting, through the speaker 116, the ultrasonic wave signal having a frequency of 21 KHz. More specifically, the scan performing device 115 includes the document sensor 115c which detects that the original document is placed on the document table 115a. The document sensor 115c is provided at the document table 115a. In response to detecting the placement of the original document by the document sensor 115c, the scanner 100 starts transmitting the ultrasonic wave signal. The ultrasonic wave signal is sequentially transmitted from the scanner 100 after the placement operation is performed, and the ultrasonic wave signal is not transmitted from the scanner 100 before the placement operation is performed. The "sequentially transmitted" described above may mean that the ultrasonic wave signal is continuously transmitted or may mean that a set of the transmission and stop of the ultrasonic wave signal is repeated. In the present embodiment, the placement operation is an operation of opening the cover member of the document table 115a and thereafter placing the original document on the transparent plate. However, in a modification, the placement operation may be an operation of opening the cover member in order to place the original document on the document table 115a. In another modification, the placement operation may be an operation of placing the original document on an ADF mechanism. In other words, as in the present embodiment, the ultrasonic wave signal may be transmitted in response to a placement operation that the original document is placed on the transparent plate. Alternatively, as in the modifications described above, the ultrasonic wave signal may be transmitted in response to a cover opening operation that the cover member is opened or in response to an ADF placement operation that the original document is placed on the ADF mechanism.

Since the terminal apparatus 10 is currently operating in the non-standby mode, even when the ultrasonic wave signal is transmitted from the scanner 100, the terminal apparatus 10 does not acquire, from the memory 24, the communication information corresponding to the frequency of the ultrasonic wave signal (in S60 of FIG. 3, the determination of the CPU 22 is not YES, and S70 is not performed). In response to receiving the operation of providing an instruction to shift from the non-standby mode to the standby mode in S120 (YES in S52), the terminal apparatus 10 operates in the standby mode (S54). In response to receiving the ultrasonic wave signal from the scanner 100 in S122 (YES in S60), in S124 the terminal apparatus 10 identifies 21 KHz which is the frequency of the ultrasonic wave signal (S62), and acquires the SSID "abc" which is the communication information that is associated with the frequency information F1 indicative of 21 KHz (YES in S64, S70).

In S130 to S140, the terminal apparatus 10 utilizes the SSID "abc" acquired in S124 so as to transmit the scan request to the scanner 100 through the Wi-Fi interface 18 (S72). Specifically, in S130, the terminal apparatus 10 transmits a probe request through the Wi-Fi interface 18 by broadcast, and in S132, the terminal apparatus 10 receives a probe response including the SSID "abc" from the scanner 100 through the Wi-Fi interface 18. Although not shown in the figure, the terminal apparatus 10 also receives a probe response from a device (for example, the AP 6) different from the scanner 100. The terminal apparatus 10 identifies, among one or more probe responses received, the probe response including the SSID "abc" acquired in S124, that is, the probe response received from the scanner 100. In this way, the terminal apparatus 10 identifies the scanner 100 as a counterpart device to which the WFD connection should be established. Then, in S134, the terminal apparatus 10 establishes the WFD connection with the scanner 100 through the Wi-Fi interface 18. The WFD connection is established through the communication of various types of signals, such as Provision Discovery, WPS (abbreviation for Wi-Fi Protected Setup), Authentication, Association, and 4-Way Handshake. In this way, the terminal apparatus 10 participates as a slave device in the WFD network in which the scanner 100 operates as the master device (that is, the G/O of the WFD system). Then, in S140, the terminal apparatus 10 transmits the scan request to the scanner 100 through the WFD network. In the WFD network, the frequency of 2.4 GHz or 5.0 GHz is utilized. Hence, the terminal apparatus 10 transmits the scan request to the scanner 100 through the WFD network, which utilizes the frequency (that is, 2.4 GHz or 5.0 GHz) different from 21 KHz that is the frequency of the ultrasonic wave signal received from the scanner 100.

In response to receiving the scan request from the terminal apparatus 10 in S140, in S142 the scanner 100 stops the transmission of the ultrasonic wave signal. Then, in S144, the scanner 100 makes the scan performing device 115 scan the original document. Then, in S146, the scanner 100 transmits the scan data obtained by the scanning of the original document to the terminal apparatus 10.

In response to receiving the scan data from the scanner 100 in S146 (S74), the terminal apparatus 10 stores the scan data in the memory 24. In this way, the user can view an image represented by the scan data.

Thereafter, in response to receiving a placement operation again in S150, in S152 the scanner 100 again starts the transmission of the ultrasonic wave signal having the frequency of 21 KHz.

The terminal apparatus 10 continues the operation in the standby mode even after the terminal apparatus 10 receives the scan data in S146. Thus, in response to receiving the ultrasonic wave signal from the scanner 100 in S152 (YES in S60) without receiving, from the user, an operation of providing the instruction to shift to the standby mode, in S154 the terminal apparatus 10 identifies 21 KHz (S62) and acquires the SSID "abc" (YES in S64, S70). Since the terminal apparatus 10 is already participating in the WFD network identified by the SSID "abc" (S134), in S160 the terminal apparatus 10 transmits a scan request to the scanner 100 without performing the processing in S130 to S134 again (S72).

S162 to S166 are the same as S142 to S146. Thereafter, in response to receiving an operation of providing the instruction to shift from the standby mode to the non-standby mode in S170 (YES in S80), the terminal apparatus 10 operates in the non-standby mode (S50). In this way, the processing of FIG. 4 is completed.

<Case B; FIG. 5>

Next, the case B, which is realized between the terminal apparatus 10 and the scanner 200, will be described with reference to FIG. 5. In the initial state of the case B, each of the terminal apparatus 10 and the scanner 200 establishes the AP connection with the AP 6, and participates, as a slave device, in the AP network in which the AP 6 operates as the master device.

S200 to S222 are the same as S100 to S122 of FIG. 4, except that the scanner 200 performs the processing and that the frequency of the ultrasonic wave signal is 22 KHz. In response to receiving the ultrasonic wave signal from the scanner 200 in S222 (YES in S60), in S224 the terminal apparatus 10 identifies 22 KHz which is the frequency of the ultrasonic wave signal (S62) and acquires, from the memory 24, the IP address "192.168.1.1" which is the communication information corresponding to the frequency information F2 indicative of 22 KHz (yes in S64, S70).

In S240, the terminal apparatus 10 utilizes the IP address "192.168.1.1" acquired in S224 so as to transmit a scan request to the scanner 200 through the Wi-Fi interface 18 (S72). Specifically, the terminal apparatus 10 transmits, through the AP network, the scan request to the scanner 200 by using the IP address as the destination. In the AP network, the frequency of 2.4 GHz or 5.0 GHz is utilized. Hence, the terminal apparatus 10 transmits the scan request to the scanner 100 through the AP network, which utilizes the frequency (that is, 2.4 GHz or 5.0 GHz) different from 22 KHz that is the frequency of the ultrasonic wave signal received from the scanner 200.

S242 to S246 are the same as S142 to S146 of FIG. 4, except that the scanner 200 performs the processing. S270 is the same as S170 of FIG. 4. When S270 is completed, the processing of FIG. 5 is completed.

<Effects of First Embodiment>

In the present embodiment, after the placement operation of placing the original document on the scanner 100 or 200 is performed at the scanner 100 or 200, the ultrasonic wave signal is sequentially transmitted from the scanner 100 or 200 (S112 of FIG. 4, S212 of FIG. 5). Hence, the terminal apparatus 10 receives the ultrasonic wave signal from the scanner 100 or 200 (S122 of FIG. 4, S222 of FIG. 5), and in this case, the terminal apparatus 10 acquires, as the communication information, the SSID "abc" or the IP address "192.168.1.1" (S124 of FIG. 4, S224 of FIG. 5). Then, the terminal apparatus 10 utilizes the acquired communication information so as to transmit the scan request to the scanner 100 or 200 through the WFD network or the AP network (S140 of FIG. 4, S240 of FIG. 5) and accordingly receives the scan data from the scanner 100 or 200 (S146 of FIG. 4, S246 of FIG. 5). As described above, by utilizing the ultrasonic wave signal which is sequentially transmitted from the scanner 100 or 200 after the placement operation is performed, that is, by utilizing a new method, the communication of the scan request and the scan data is performed between the terminal apparatus 10 and the scanner 100 or 200. In particular, the ultrasonic wave signal having a frequency which is not recognized by humans is utilized, not sound waves having frequencies which are recognized by humans. Hence, the communication of the scan request and the scan data is performed without giving an uncomfortable feeling to the user. The ultrasonic wave signal is transmitted from the speaker and is received by the microphone. The speaker is an interface which is normally provided in a common scanner, and the microphone is an interface which is normally provided in a common terminal apparatus. Hence, in the present embodiment, without provision of a particular interface to the terminal apparatus 10 and the scanner 100 or 200, by utilizing the ultrasonic wave signal, the communication of the scan request and the scan data is performed between the terminal apparatus 10 and the scanner 100 or 200.

In a conventional method (hereinafter referred to as a "first method") in which the communication of scan data is performed without performing the communication of the scan request, after the original document is placed on the scanner, an operation of selecting a device which is the destination of the scan data and an operation of pressing down a scan start button are performed on the operation panel of the scanner. In this case, the scanner scans the original document without receiving a scan request from the device so as to generate scan data, and transmits the scan data to the device. In the present embodiment, as compared with the first method described above, it is not necessary to perform, at the scanner 100 or 200, the operation of selecting the terminal apparatus 10 and the operation of pressing down the scan start button. Hence, the convenience of the user is enhanced.

In a conventional method (hereinafter referred to as a "second method") in which the communication of a scan request and scan data is performed, after the original document is placed on the scanner, an operation of selecting the scanner is performed at the terminal apparatus. In this case, the terminal apparatus transmits the scan request to the scanner and receives the scan data from the scanner. In the present embodiment, as compared with the second method described above, it is not necessary to perform, at the terminal apparatus 10, the operation of selecting the scanner 100 or 200. Hence, the convenience of the user is enhanced.

The terminal apparatus 10 and the scanner 100 or 200 are non-limiting examples of "terminal apparatus" and "target scanner", respectively. The microphone 16 and the Wi-Fi interface 18 are non-limiting examples of "first interface" and "second interface", respectively. The ultrasonic wave signal transmitted from the scanner 100 or 200, WFD network or AP network, SSID "abc" or IP address "192.168.1.1", and frequency information F1 or F2 are non-limiting examples of "target signal", "target network", "target communication information", and "identification information", respectively. The frequency 21 KHz or 22 KHz is a non-limiting example of "first frequency". The frequency 2.4 GHz or 5.0 GHz is a non-limiting example of "second frequency". The scanner 100, the ultrasonic wave signal transmitted from the scanner 100, and the SSID "abc" are non-limiting examples of "first scanner", "first signal", and "first communication information", respectively. The scanner 200, the ultrasonic wave signal transmitted from the scanner 200, and the IP address "192.168.1.1" are non-limiting examples of "second scanner", "second signal", and "second communication information", respectively. The non-standby mode and the standby mode are non-limiting examples of "first mode" and "second mode", respectively. The operation of instructing a shift from the non-standby mode to the standby mode is a non-limiting example of "particular operation".

The processing of S54, S60, S62, S70, S72, and S74 in FIG. 3 are non-limiting examples of processing performed by "mode shifting operation", "target-signal receiving operation", "identifying operation", "acquiring operation", "scan-request transmitting operation", and "scan-data receiving operation", respectively. The processing of S20 and S40 in FIG. 2 are non-limiting examples of processing performed by "storage controlling operation". The processing of S112, S140, S144, and S146 in FIG. 4 are non-limiting examples of processing performed by "target signal transmitting operation", "scan request receiving operation", "scan controlling operation", and "scan data transmitting operation", respectively.

<Second Embodiment>

Next, a second embodiment will be described. As shown in FIG. 1, in the present embodiment, the scanner 100 and the scanner 200 have a device name "AAA" and a device name "BBB", respectively. The memory 24 stores correspondence information 30c and correspondence information 30d instead of the correspondence information 30a and the correspondence information 30b. The correspondence information 30c and the correspondence information 30d which include the device name "AAA" and the device name "BBB", respectively, instead of the frequency information F1 and the frequency information F2, and are stored in the memory 24 as follows.

In S16 of FIG. 2, the scanner 100 transmits, instead of the frequency information F1, the device name "AAA" to the terminal apparatus 10. In response to receiving the device name "AAA" from the scanner 100 in S16, in S20 the terminal apparatus 10 stores, in the memory 24, the correspondence information 30c in which the device name "AAA" is associated with the SSID "abc".

In S36 of FIG. 2, the scanner 200 transmits, instead of the frequency information F2, the device name "BBB" to the terminal apparatus 10. In response to receiving the device name "BBB" from the scanner 200 in S36, in S40 the terminal apparatus 10 stores, in the memory 24, the correspondence information 30d in which the device name "BBB" is associated with the IP address "192.168.1.1".

In the present embodiment, the scanners 100 and 200 transmit ultrasonic waves signal having the same frequency (for example, 21 KHz). However, the scanner 100 transmits the ultrasonic wave signal including the device name "AAA", and the scanner 200 transmits the ultrasonic wave signal including the device name "BBB". In S62 of FIG. 3, the CPU 22 identifies the device name included in the ultrasonic wave signal. In S64, the CPU 22 determines whether the identified device name matches any of one or more device names included in one or more correspondence information in the memory 24. In S70, the CPU 22 acquires the communication information corresponding to the identified device name.

Figure 6:
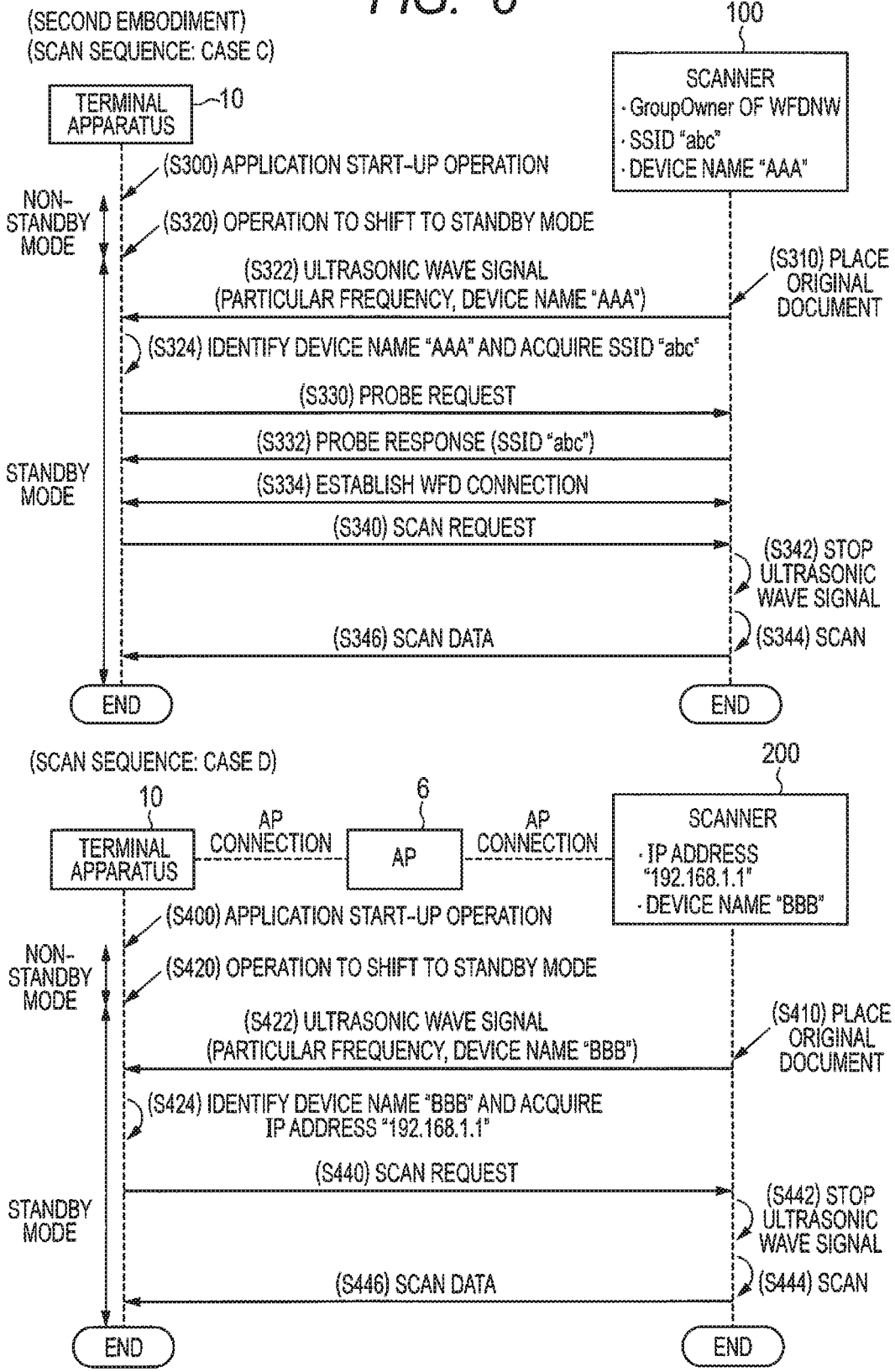
FIG. 6 shows sequence charts of cases C and D according to the second embodiment.

<Specific Cases; FIG. 6>

Next, specific cases C and D, which are realized in the present embodiment, will be described with reference to FIG. 6. The initial state of the case C is the same as that of the case A of FIG. 4. S300, S310, and S320 are the same as S100, S110, and S120 in FIG. 4. In S322, the scanner 100 starts the transmission of the ultrasonic wave signal which has a particular frequency (for example, 21 KHz) and which includes the device name "AAA".

In response to receiving the ultrasonic wave signal from the scanner 100 in S322 (YES in S60 of FIG. 3), in S324 the terminal apparatus 10 identifies the device name "AAA" included in the ultrasonic wave signal (S62), and acquires, from the memory 24, the SSID "abc" corresponding to the device name "AAA" (YES in S64, S70). S330 to S346 are the same as S130 to S146 in FIG. 4.

The initial state of the case D is the same as that of the case B of FIG. 5. S400, S410, and S420 are the same as S200, S210, and S220 in FIG. 5. In S422, the scanner 200 starts the transmission of the ultrasonic wave signal which has the particular frequency (for example, 21 KHz) and which includes the device name "BBB".

In response to receiving the ultrasonic wave signal from the scanner 200 in S422 (YES in S60 of FIG. 3), in S424 the terminal apparatus 10 identifies the device name "BBB" included in the ultrasonic wave signal (S62), and acquires, from the memory 24, the IP address "192.168.1.1" corresponding to the device name "BBB" (YES in S64, S70). S440 to S446 are the same as S240 to S246 in FIG. 5.

In the present embodiment, too, by utilizing the ultrasonic wave signal which is sequentially transmitted from the scanner 100 or 200 after the placement operation is performed, that is, by utilizing a new method, the communication of the scan request and the scan data is performed between the terminal apparatus 10 and the scanner 100 or 200. In particular, as compared with the conventional first and second methods described above, the convenience of the user is enhanced. In the present embodiment, the device name "AAA" or "BBB" is a non-limiting example of "identification information".

While the disclosure has been described in detail with reference to the above aspects thereof, it would be apparent to those skilled in the art that various changes and modifications may be made therein without departing from the scope of the claims.

<Modification 1>

The memory 24 does not need to store a plurality of correspondence information 30a and 30b, and may store only one correspondence information. For example, when the memory 24 stores only the correspondence information 30a of the scanner 100, the case A of FIG. 4 is realized. In this modification, the scanner 100 and the SSID "abc" are non-limiting examples of "target scanner" and "target communication information", respectively. For example, when the memory 24 stores only the correspondence information 30b of the scanner 200, the case B of FIG. 5 is realized. In this modification, the scanner 200 and the IP address "192.168.1.1" are non-limiting examples of "target scanner" and "target communication information", respectively.

<Modification 2>

S50 and S52 in FIG. 3 may be omitted. That is, when the application 28 is started up, the CPU 22 may operate in the standby mode without going through the non-standby mode. In other words, a "mode shifting operation" may be omitted.

<Modification 3>

The sound wave signal transmitted from the scanner 100 or 200 does not need to be an ultrasonic wave signal, and may be a sound wave signal having a frequency which is recognized by humans.

<Modification 4>

In the embodiments described above, in response to the placement operation of placing the original document of the scan target on the document table 115a, the scanner 100 starts transmitting the ultrasonic wave signal (for example, S110 of FIG. 4). Instead of this configuration, in response to receiving the placement operation and an operation of pressing down a particular button for providing an instruction to transmit the ultrasonic wave signal, the scanner 100 may start transmitting the ultrasonic wave signal. Generally speaking, the "target signal" is preferably a signal which is sequentially transmitted from the target scanner after the placement operation is performed at the target scanner.

<Modification 5>

In FIG. 2 of the first embodiment, the terminal apparatus 10 may receive, in S36, both the frequency information F2 and the device name "BBB" from the scanner 200. In this case, instead of storing the correspondence information 30b, the terminal apparatus 10 stores, in S40, the correspondence information in which the frequency information F2 is associated with the device name "BBB". Then, in S224 in FIG. 5, the terminal apparatus 10 acquires the device name "BBB" instead of the IP address "192.168.1.1", transmits the device name "BBB" to an unillustrated DNS (abbreviation of Domain Name System) server, and acquires the IP address of the scanner 200 from the DNS server. Then, in S240, the terminal apparatus 10 transmits a scan request to the scanner 200 by using the IP address as the destination. In this modification, the device name "BBB" is a non-limiting example of "target communication information".

<Modification 6>

In FIG. 2 of the second embodiment, the terminal apparatus 10 may receive, in S36, the device name "BBB" from the scanner 200 and store, in S40, only the device name "BBB" instead of storing the correspondence information 30c. Then, in S424 in FIG. 6, the terminal apparatus 10 acquires the device name "BBB" included in the ultrasonic wave signal, checks whether the acquired device name "BBB" matches the device name "BBB" in the memory 24, transmits the device name "BBB" to the unillustrated DNS (abbreviation of Domain Name System) server, and acquires the IP address of the scanner 200 from the DNS server. Then, in S240, the terminal apparatus 10 transmits a scan request to the scanner 200 by using the IP address as the destination. In this modification, the device name "BBB" is a non-limiting example of "target communication information", and S424 is a non-limiting example of processing executed by "acquiring operation". Further, "storage controlling operation" may be omitted.

<Modification 7>

The terminal apparatus 10 may include a BT interface for performing BlueTooth (registered trademark) communication. The scanner 100 may also include the BT interface. In this case, in S16 of FIG. 2, the terminal apparatus 10 receives, from the scanner 100, the device name "AAA" of the scanner 100 and the MAC address of the BT interface of the scanner 100 and stores, in S20, the device name "AAA" and the MAC address in association with each other. In response to receiving the placement operation, the scanner 100 sequentially transmits, through the BT interface, a BT signal including the device name "AAA" of the scanner 100. In response to receiving the BT signal from the scanner 100, the terminal apparatus 10 identifies the device name "AAA"

included in the BT signal, acquires the MAC address corresponding to the device name "AAA" from the memory 24, and establishes BT connection with the scanner 100 through the BT interface by utilizing the MAC address. In this way, a BT network is formed by the terminal apparatus 10 and the scanner 100. Then, the terminal apparatus 10 transmits a scan request to the scanner 100 through the BT network, and receives scan data from the scanner 100 through the BT network. In this modification, the BT network and the MAC address of the BT interface of the scanner 100 are non-limiting examples of "target network" and "target communication information", respectively.

<Modification 8>

The scanner 100 may operate as a so-called SoftAP instead of operating as the G/O of the WFDNW (Wi-Fi Direct network). In this modification, the SoftAP is a non-limiting example of "master device".

<Modification 9>

In the embodiments described above, the CPU 22 or 122 performs the programs 26, 28 and 126 in the memory 24 so as to realize each of the processing in FIGS. 2 to 6. Instead of this configuration, at least one of the processing may be realized by hardware such as a logic circuit.

What is claimed is:

1. A scanner comprising:
   an interface configured to output a target signal to a terminal apparatus;
   a scan performing device comprising at least one of an ADF (Auto Document Feeder) and an FB (Flat Bed); and
   a scanner controller configured to perform:
      sequentially transmitting, via the interface to the terminal apparatus, the target signal after a placement operation of placing an original document of a scan target on the at least one of the ADF and the FB is performed, the target signal not being transmitted before the placement operation is performed;
      receiving a scan request from the terminal apparatus through a target network for performing wireless communication between the scanner and the terminal apparatus after the terminal apparatus has received the target signal, the scan request requesting that the scanner performs scan of the original document;
      in response to receiving the scan request, controlling the scan performing device to perform scan of the original document; and
      transmitting scan data to the terminal apparatus through the target network, the scan data being obtained by scan of the original document.

2. The scanner according to claim 1, wherein the target signal is used for identifying identification information, the identification information being for identifying the scanner.

3. The scanner according to claim 2, wherein the identification information includes a device name of the scanner.

4. The scanner according to claim 1, wherein the target signal transmitted from the scanner has a first frequency; and
   wherein a second frequency is used for communication in the target network, the second frequency being different from the first frequency.

5. The scanner according to claim 1, further comprising:
   a document sensor,
   wherein the scanner controller is configured to start transmitting the target signal in response to detecting the placement operation by the document sensor.

6. A scanner comprising:
   a scan performing device comprising at least one of an ADF (Auto Document Feeder) and an FB (Flat Bed); and
   a scanner controller configured to perform:
      sequentially transmitting a target signal after a placement operation of placing an original document of a scan target on the at least one of the ADF and the FB is performed, the target signal not being transmitted before the placement operation is performed;
      receiving a scan request from a terminal apparatus through a target network for performing wireless communication between the scanner and the terminal apparatus after the terminal apparatus has received the target signal, the scan request requesting that the scanner performs scan of the original document;
      in response to receiving the scan request, controlling the scan performing device to perform scan of the original document; and
      transmitting scan data to the terminal apparatus through the target network, the scan data being obtained by scan of the original document,
   wherein the target network is a wireless network in which the scanner operates as a master device.

7. A scanner comprising:
   a first scanner interface;
   a second scanner interface different from the first scanner interface;
   a scan performing device comprising at least one of an ADF (Auto Document Feeder) and an FB (Flat Bed); and
   a scanner controller configured to perform:
      sequentially transmitting, through the first scanner interface, a target signal after a placement operation of placing an original document of a scan target on the at least one of the ADF and the FB is performed, the target signal not being transmitted before the placement operation is performed;
      receiving, through the second scanner interface, a scan request from a terminal apparatus through a target network for performing wireless communication between the scanner and the terminal apparatus after the terminal apparatus has received the target signal, the scan request requesting that the scanner performs scan of the original document;
      in response to receiving the scan request, controlling the scan performing device to perform scan of the original document; and
      transmitting, through the second scanner interface, scan data to the terminal apparatus through the target network, the scan data being obtained by scan of the original document.

8. The scanner according to claim 7, wherein the first scanner interface is a speaker; and
   wherein the target signal is an ultrasonic wave signal.

* * * * *